United States Patent
Lee et al.

(10) Patent No.: US 8,228,449 B2
(45) Date of Patent: Jul. 24, 2012

(54) 3D GLASSES FOR STEREOSCOPIC DISPLAY DEVICE AND STEREOSCOPIC DISPLAY DEVICE INCLUDING THE SAME

(75) Inventors: Dae Hee Lee, Daejeon (KR); Moon-Soo Park, Daejeon (KR); Seung-Hun Chae, Daejeon (KR)

(73) Assignee: LG Chem, Ltd., Seoul (KR)

( * ) Notice: Subject to any disclaimer, the term of this patent is extended or adjusted under 35 U.S.C. 154(b) by 47 days.

(21) Appl. No.: 12/996,241

(22) PCT Filed: Oct. 15, 2010

(86) PCT No.: PCT/KR2010/007094
§ 371 (c)(1),
(2), (4) Date: Dec. 3, 2010

(87) PCT Pub. No.: WO2011/078471
PCT Pub. Date: Jun. 30, 2011

(65) Prior Publication Data
US 2011/0205459 A1    Aug. 25, 2011

(30) Foreign Application Priority Data

Dec. 22, 2009  (KR) .................. 10-2009-0129309
Aug. 20, 2010  (KR) .................. 10-2010-0081049

(51) Int. Cl.
*G02F 1/1335*    (2006.01)

(52) U.S. Cl. ............... 349/15; 349/13; 349/117; 349/96
(58) Field of Classification Search .................. 349/15, 349/13, 117, 96
See application file for complete search history.

(56) References Cited

U.S. PATENT DOCUMENTS
6,963,356 B2 *  11/2005  Satoh .............................. 348/51

FOREIGN PATENT DOCUMENTS
JP    2006-072298 A    3/2006
JP    2008-170557 A    7/2008
* cited by examiner

*Primary Examiner* — Thoi Duong
(74) *Attorney, Agent, or Firm* — Rothwell, Figg, Ernst & Manbeck, P.C.

(57) ABSTRACT

There are provided 3D glasses for use in a stereoscopic display device including a display panel for emitting right-eye image light and left-eye image light and an optical filter including a first area for adjusting a polarized state of the right-eye image light and a second area for adjusting a polarized state of the left-eye image light, comprising a right-eye area allowing right-eye image light to pass therethrough and a left-eye area allowing left-eye image light to pass therethrough; and compensation films disposed at the right-eye area and the left-eye area to compensate for a phase difference deviation between the first and second areas of the optical filter, wherein a phase difference value of the compensation film provided at the right-eye area and that of the compensation film provided at the left-eye area are different.

14 Claims, 3 Drawing Sheets

3D GLASSES FOR STEREOSCOPIC DISPLAY DEVICE AND STEREOSCOPIC DISPLAY DEVICE INCLUDING THE SAME

CROSS REFERENCE TO RELATED APPLICATIONS

This application is a 35 U.S.C. §371 National Phase Entry Application from PCT/KR2010/007094, filed on Oct. 15, 2010, and designating the United States, which claims priority under 35 U.S.C. §119 to Korean Patent Application No. 10-2009-0129309 filed on Dec. 22, 2009 and to Korean Patent Application No. 10-2010-0081049 filed on Aug. 20, 2010, which are incorporated herein in their entireties.

TECHNICAL FIELD

The present invention relates to three-dimensional (3D) glasses for a stereoscopic display device and a stereoscopic display device including the same, and more particularly, to 3D glasses developed for compensating for a phase difference deviation generated between a right-eye image transmission area and a left-eye image transmission area of an optical filter, and a stereoscopic display device including the 3D glasses.

BACKGROUND ART

Unlike existing 2D images, a 3D stereoscopic image is an image of a novel concept which is virtually similar to an actual image experienced by human beings, improving the quality level of visual information by a dimension. In general, the reason why human beings feel a 3D effect is because the right-eye and the left-eye recognize an object with a time difference. Namely, because the eyes of human beings are positioned to be spaced apart by an interval of approximately 65 mm, they see images in slightly different directions, thus achieving a 3D effect due to binocular disparity (or parallax). Namely, a 3D image effect can be implemented by inputting an image having a time difference to both of the eyes of a viewer.

The related art stereoscopic display device may be divided into a stereoscopic display device using 3D glasses and a stereoscopic display device not using 3D glasses. The stereoscopic display device using 3D glasses is devised to display a left-eye image and a right-eye image each having different polarization characteristics, and a polarizer or the like is attached to 3D glasses to allow only a left-eye image to be projected onto a left-eye lens and only a right-eye image to be projected onto a right-eye lens, thus allowing the user to experience a 3D effect. The 3D glasses scheme is disadvantageous in that the user must wear glasses, but advantageous in that restrictions on a viewing angle can be reduced and fabrication can be facilitated.

In general, the related art stereoscopic display device using 3D glasses includes a display panel for producing left-eye image light and right-eye image light and an optical filter attached to the display panel to change a polarization state of the left-eye image light and right-eye image light so as to have mutually different polarized states.

In this case, the optical filter is formed to have alternately patterned first and second areas and, in this case, the first area adjusts a polarized state of the right-eye image light and the second area adjusts a polarized state of the left-eye image light. In general, the first and second areas have the same phase difference values and phase difference layers whose optical axes are perpendicular to each other; for example, a $-\lambda/4$ phase difference layer and $+\lambda/4$ phase difference layer may be alternately arranged in stripes or in a checkerboard pattern.

The optical filter including alternately patterned first and second areas may be fabricated by coating photoresist on a substrate (or a base member), exposing a predetermined portion thereof, and processing the resultant structure with a potassium hydroxide solution to allow a certain portion to lose a phase difference delay function.

However, this method has a problem in that a complicated fabrication process must be performed due to chemical etching, resultantly increasing manufacturing costs and lowering productivity.

Another method for fabricating an optical filter is forming a phase difference layer by coating liquid crystal on a substrate or attaching a polymer stretched film or the like onto the substrate and removing a portion of the phase difference layer by laser, a grinder, or the like. However, this method has a problem in that it is difficult to obtain precise patterning and the phase difference layer may be damaged by laser, etching or the like, resulting in a defective optical filter.

In addition, with these methods, it is not easy to fabricate the optical filter such that the patterns of the optical filter are precisely matched to pixels of the display panel and the discrepancy between the patterns of the optical filter and the pixels of the display panel causes a high crosstalk rate.

In an effort to solve such problems, a method for fabricating an optical filter for a stereoscopic display device by printing a liquid crystal material for the formation of an alignment layer and/or a phase difference layer only on one of first and second areas of a substrate has been proposed. This method is advantageous in that pixels of a display panel and patterns of the optical filter are highly matched. However, in this method, the optical filter is fabricated such that a portion in which a liquid crystal layer is aligned (hereinafter, referred to as an 'aligned portion') and a portion in which a liquid crystal layer is not aligned (hereinafter, referred to as a 'non-aligned portion') are alternately arranged, and in this case, the optical performance of the non-aligned portion is considerably lower than that of the aligned portion, degrading the picture quality of an image display device overall.

Thus, in order to solve the problem, a method for forming an optical alignment layer on a substrate, performing primary alignment by irradiating UV polarized light, performing secondary alignment by irradiating UV polarized light perpendicular to the primarily irradiated UV polarized light only to a partial area by using a mask, and coating a liquid crystal layer thereon has been proposed. This method advantageously eliminates the presence of a non-aligned liquid crystal layer, but is disadvantageous in that the use of a mask makes the process complicated, and because the intensities of UV light irradiated onto the secondarily aligned area and the primarily aligned area are different, the liquid crystal alignment degree by the primarily aligned alignment layer and that by the secondarily aligned alignment layer are not uniform, resulting in a phase difference deviation. The phase difference deviation restrains a left-eye image and a right-eye image from being clearly separated and produces crosstalk, therefore failing to implement a sharp stereoscopic image.

DISCLOSURE OF INVENTION

Technical Problem

An aspect of the present invention provides polarized three-dimensional (3D) glasses capable of implementing a clear 3D image by compensating for a phase difference deviation between first and second areas of an optical filter, and a stereoscopic display device including the 3D glasses.

Solution to Problem

According to an aspect of the present invention, there are provided 3D glasses for use in a stereoscopic display device including a display panel for emitting right-eye image light and left-eye image light and an optical filter including a first area for adjusting a polarized state of the right-eye image light and a second area for adjusting a polarized state of the left-eye image light, comprising a right-eye area allowing right-eye image light to pass therethrough and a left-eye area allowing left-eye image light to pass therethrough; and compensation films disposed at the right-eye area and the left-eye area to compensate for a phase difference deviation between the first and second areas of the optical filter, wherein a phase difference value of the compensation film provided at the right-eye area and that of the compensation film provided at the left-eye area are different.

According to another aspect of the present invention, there is provided a stereoscopic display device including: a display panel emitting right-eye image light and left-eye image light; an optical filter including a first area for adjusting a polarized state of the right-eye image light and a second area for adjusting a polarized state of the left-eye image light; and 3D glasses including a right-eye area allowing right-eye image light to pass therethrough and a left-eye area allowing left-eye image light to pass therethrough, wherein compensation films are disposed at the right-eye area and the left-eye area to compensate for a phase difference deviation between the first and second areas of the optical filter, and a phase difference value of the compensation film provided at the right-eye area and that of the compensation film provided at the left-eye area are different.

Advantageous Effects of Invention

The 3D glasses have compensation films having different phase differences at the right-eye area and left-eye area, respectively to compensate for a phase difference deviation generated between the first and second areas of the optical filter, thus preventing the generation of crosstalk otherwise caused by a phase difference deviation and implementing a clear stereoscopic image.

BEST MODE FOR CARRYING OUT THE INVENTION

Figure 1:
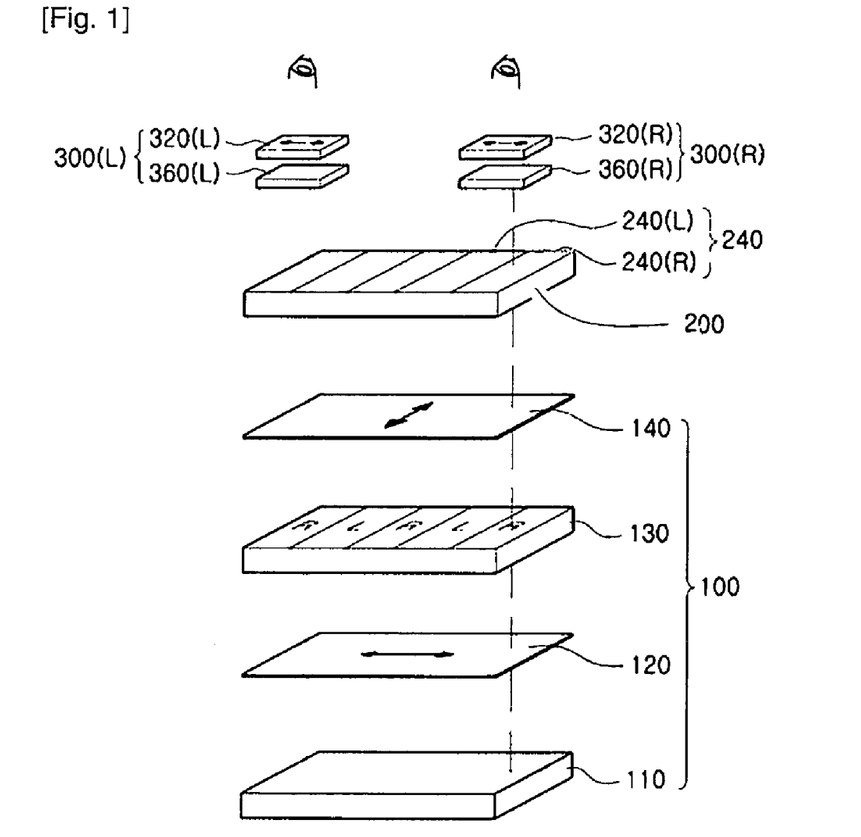
FIG. 1 illustrates a stereoscopic display device according to an exemplary embodiment of the present invention.

FIG. 1 illustrates a stereoscopic display device according to an exemplary embodiment of the present invention. Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

An exemplary embodiment of the present invention provides polarized three-dimensional (3D) glasses 300 for use in a stereoscopic display device including a display panel 100 and an optical filter 200. The 3D glasses 300 include compensation films 700 for compensating for a phase difference deviation of the optical filter 200 at a right-eye area 300R and a left-eye area 300L, and in this case, the compensation film 700R provided at the right-eye area 300R and the compensation film 700L provided at the left-eye area 300L have mutually different phase difference values, respectively.

The display panel 100, which generates left-eye image light and right-eye image light to form a stereoscopic image, may include, for example, a display element 130 such as an LCD panel including LCD cells disposed two-dimensionally in a horizontal direction or vertical direction.

A light source 110 may be disposed at a rear side of the display element 130 in order to supply light to the display element 130. Polarizers 120 and 140 may be provided on both sides of the display element 130. The polarizer disposed between the light source 110 and the display element 130 will be referred to as a first polarizer 120, and the polarizer disposed between the display element 130 and the optical filter 200 will be referred to as a second polarizer 140, for the sake of convenience. The first and second polarizers 120 and 140 allow light in a particular polarized state to pass therethrough or block light to implement light and shade. The first and second polarizers 120 and 140 are generally disposed such that their absorption axes are perpendicular to each other.

The optical filter 200, serving to provide different polarization states to left-eye image light and right-eye image light output from the display panel 100, includes a first area 240R for adjusting a polarization state of the right-eye image light and a second area 240L for adjusting a polarization state of the left-eye image light.

The optical filter 200 may not be particularly limited in its structure or fabrication method so long as it can provide different polarization states to the left-eye image light and the right-eye image light. Namely, optical filters of various structures used in the art may be used without any limitation. For example, as the optical filter, a $\lambda/4$ phase difference layer patterned such that first and second areas have mutually perpendicular alignment directions, a $\lambda/2$ phase difference layer formed at only one of the first and second areas, or a laminated body of the $\lambda/4$ phase difference layer and the $\lambda/2$ phase difference layer formed at only one of the first and second areas may be used. Most ideally, the optical filter is configured such that the first and second areas have identical phase difference values and phase difference directions perpendicular to each other, but it is virtually impossible to fabricate an optical filter having such characteristics in actuality.

For example, the $\lambda/4$ phase difference layer patterned such that the first and second areas have mutually perpendicular alignment directions may be fabricated by coating an alignment layer on a substrate (or a base member), primarily irradiating polarized UV on the alignment layer to primarily align an alignment layer, and then secondarily irradiating polarized UV through a mask designed not to allow light to pass therethrough at a portion corresponding to the first area 240R to secondarily align only the portion corresponding to the second area 240L. In this case, the polarization directions of the primarily irradiated polarized UV and the secondarily irradiated polarized UV are perpendicular to each other. The aligning of the alignment layer is determined according to the direction of the finally irradiated polarized UV. Thus, according to this method, the first area 240R may be aligned in the polarization direction of the primarily irradiated polarized UV, and the second area 240L is aligned in the polarization direction of the secondarily irradiated polarized UV, thus fabricating the optical filter having the first and second areas 240R and 240L whose phase difference directions are perpendicular to each other.

However, when the optical filter is fabricated through double light irradiation, light is irradiated to the alignment layer of the first area 240R once, while light is irradiated to the alignment layer of the second area 240L twice. In this case, because the amounts of light irradiation differ, the liquid crystal alignment capabilities (or liquid crystal aligning ability) of the alignment layers are different. Thus, because the alignment degree of a liquid crystal layer formed on the first area 240R and that of a liquid crystal layer formed on the second area 240L are not precisely equal to each other, the sizes of the phase difference values are not identical.

Meanwhile, in the case of the optical filter fabricated by laminating a λ/2 phase difference layer formed on only one of the first area 240R and the second area 240L on the λ/4 phase difference layer, it is fabricated by forming the λ/4 phase difference layer on one surface of a substrate, forming the λ/2 phase difference layer on the other surface of the substrate, and then removing the λ/2 phase difference layer at the portion corresponding to the first area 240R or the second area 240L by laser or through etching, etc. In this case, a phase difference deviation may be generated due to heat or a chemical reaction in the process of removing the λ/2 phase difference layer.

That is, a phase difference deviation may be generated between the first area 240R and the second area 240L of the optical filter due to various reasons, and the generated phase difference deviation causes a left-eye image and a right-eye image not to be clearly separated, so a sharp stereoscopic image cannot be implemented.

Thus, in order to address the problems, the inventors of this application have made a repeated in-depth study to discover a solution to a crosstalk problem caused by the phase difference deviation generated in the optical filter by installing compensation films each having a different phase difference value on the right-eye area 300R and the left-eye area 300L of the 3D glasses 300, and completed the present invention.

The configuration of the 3D glasses according to an exemplary embodiment of the present invention will now be described.

The 3D glasses according to an exemplary embodiment of the present invention are configured to include the right-eye area 300R allowing right-eye image light to pass therethrough and the left-eye area 300L allowing left-eye image light to pass therethrough.

As shown in FIG. 1, in the 3D glasses according to an exemplary embodiment of the present invention, the right-eye area 300R and the left-eye area 300L include the polarizer 320R allowing right-eye image light to pass therethrough, the polarizer 320L allowing left-eye image light to pass therethrough, and compensation films 360R and 360L attached too the polarizers 320R and 320L, respectively. In this case, the compensation film 360R attached to the right-eye area 300R and the compensation film 360L attached to the left-eye area 300L have mutually different sizes of phase difference values.

Preferably, the compensation film 360R attached to the right-eye area 300R of the 3D glasses according to an exemplary embodiment of the present invention has a phase difference value having the same size as that of the second area 240L of the optical filter and an optical axis perpendicular to that of the second area 240L, and the compensation film 360L attached to the left-eye area 300L has a phase difference value having the same size as that of the first area 240R of the optical filter and an optical axis perpendicular to that of the second area 240R. Namely, when the phase difference value of the first area 240R of the optical filter is α, the phase difference value of the second area 240L of the optical filter is β, and the wavelength of image light emitted from the display panel 100 is λ, then, α+β=λ/2, α≠β and preferably, the compensation film 360R included in the right-eye area 300R has a phase difference value β and an optical axis perpendicular to that of the second area 240L, and the compensation film 360L included in the left-eye area 300L has a phase difference value α and an optical axis perpendicular to that of the first area 240R.

Meanwhile, the polarizers 320R and 320L of the right-eye area 300R and the left-eye area 300L have a light transmission axis perpendicular to a light transmission axis of the second polarizer 140 disposed between the display element 130 and the optical filter 200, but the present invention is not limited thereto.

Figure 4:
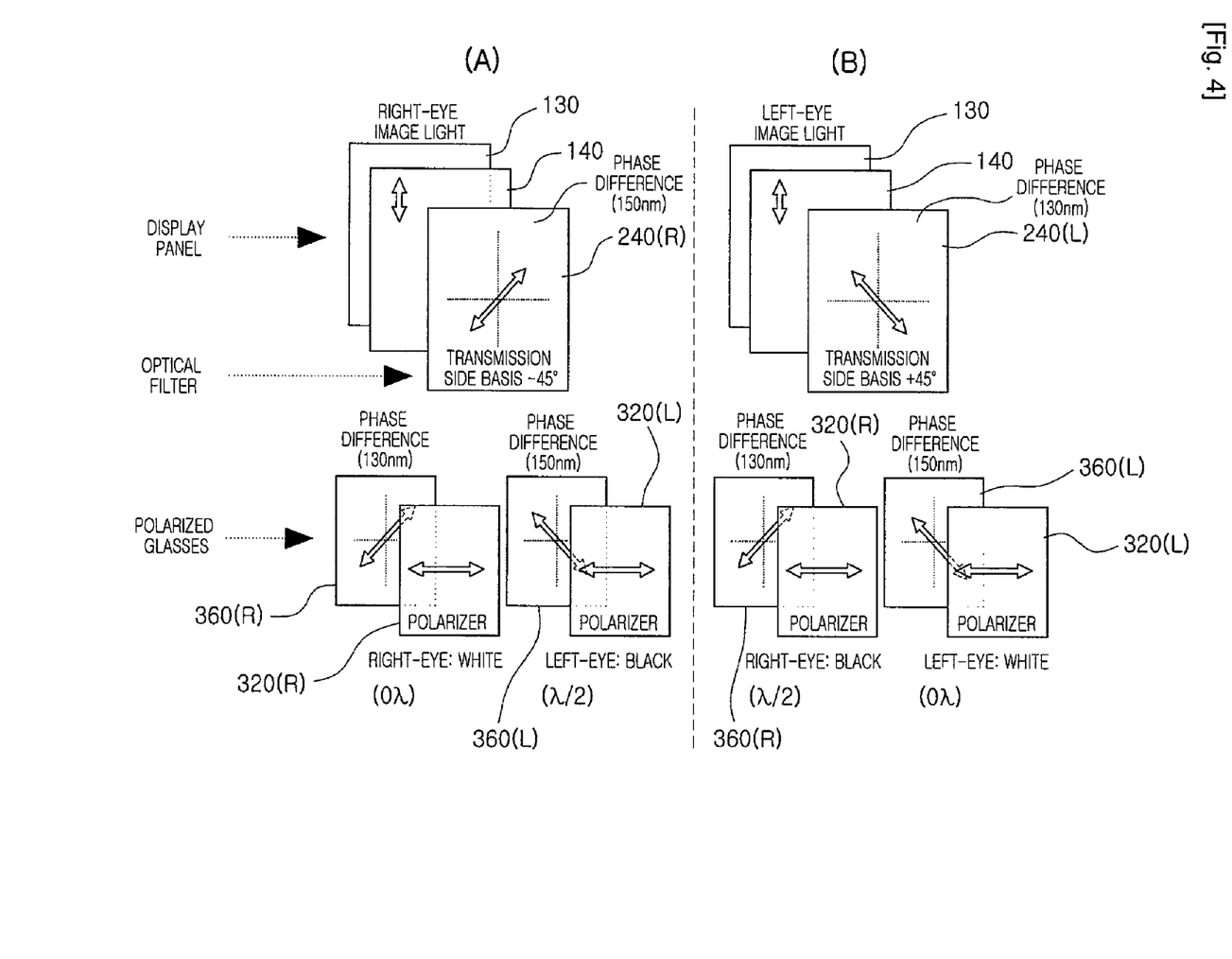
FIGS. 4A and 4B are views for explaining the principle of optical compensation in 3D glasses according to an exemplary embodiment of the present invention.

FIGS. 4A and 4B are views for explaining the principle of compensating for a phase difference deviation of the optical filter through the 3D glasses according to an exemplary embodiment of the present invention. Hereinafter, the principle of compensating for a phase difference deviation according to an exemplary embodiment of the present invention will be described with reference to FIGS. 4A and 4B. Specifically, FIG. 4A illustrates the path of right-eye image light, and FIG. 4B illustrates the path of left-eye image light.

For example, it is assumed that the wavelength of light emitted from the display panel according to an exemplary embodiment of the present invention is λ=560 nm, the first area 240R of the optical filter has a phase difference value of 150 nm and has an optical axis of −45° and the second area 240L of the optical filter has a phase difference value of 130 nm and has an optical axis of +45°.

In this case, the compensation film 360R of the right-eye area 300R of the 3D glasses according to an exemplary embodiment of the present invention has a phase difference value of 130 nm and an optical axis of −45° and the compensation film 360L of the left-eye area 300L of the 3D glasses according to an exemplary embodiment of the present invention has a phase difference value of 150 nm and an optical axis of +45°.

First the path of right-eye image light illustrated in FIG. 4A will be described.

The optical axis of the first area 240R of the optical filter and that of the compensation film 360R of the right-eye area are parallel, so light (namely, right-eye image light) which has passed through the first area 240R of the optical filter can pass through the compensation film 360R of the right-eye area 300R. Meanwhile, the right-eye image light has a phase delay of 150 nm while passing through the first area 240R of the optical filter, and when it passes through the compensation film 360R of the right-eye area 300R, it has a phase delay of 130 nm. Thus, the phase delay generated at the first area 240R of the optical filter and the phase delay generated at the compensation film 360R of the right-eye area 300R total 280 nm, which corresponds to λ/2. Thus, finally, the right-eye image light has a total λ/2 phase difference value (namely, the optical axis is rotated by 90° to transmit through the polarizer 320R of the right-eye area 300R. As a result, the right-eye image light can be projected onto a right eye behind the 3D glasses.

Meanwhile, the second area 240L of the optical filter and the compensation film 360R of the right-eye area 300R have the same amount of phase difference value and optical axes which are perpendicular to each other. Thus, light (namely, left-eye image light) which has transmitted through the second area 240L of the optical filter is canceled out, which, thus, cannot pass through the compensation film 350R of the right-eye area 300R. Consequently, the left-eye image light cannot reach the right eye behind the 3D glasses.

The path of the left-eye image light is similar. Namely, the second area 240L of the optical filter and the compensation film 360L of the left-eye area 300L have the same optical axis, so that left-eye image light can pass through the compensation film 360L of the left-eye area 300L, and in this process, the left-eye image light undergoes two phase delays. Thus, the phase difference value of the left-eye image light totals $\lambda/2$ (namely, the optical axis is rotated by 90°), and thus, the left-eye image light can pass through the polarizer 320L of the left-eye area 300L. As a result, the left-eye image light can be projected onto a left eye behind the 3D glasses.

However, because the right-eye image light which has passed through the first area 240R of the optical filter is canceled out, not passing through the compensation film 360L of the left-eye area 300L, the right-eye image light cannot reach the left-eye.

In this manner, when the 3D glasses according to an exemplary embodiment of the present invention is used, although there is a phase difference deviation in the optical filter, left-eye image light can be transmitted to the left-eye area and right-eye image light can be transmitted to the right-eye area, thus implementing a clear stereoscopic image without crosstalk.

Meanwhile, if 3D glasses including compensation films having the same size of phase difference value attached to the right-eye area and the left-eye area are used with a stereoscopic display device under the same conditions as described above, a crosstalk improvement effect cannot be obtained. For example, it is assumed that a compensation film having a phase difference value of 140 nm and an optical axis of −45° is attached to the right-eye area and a compensation film having a phase difference value of 140 nm and an optical axis of +45° is attached to the left-eye area. In this case, while right-eye image light is passing through the first area of the optical filter, a phase difference of 150 nm is generated, and the resultant light is projected onto the 3D glasses. In this case, because the compensation film of the left-eye area of the 3D glasses has an optical axis perpendicular to the first area of the optical filter but has a phase difference value of 140 nm, the right-eye image light cannot be completely canceled out in the compensation film and a portion thereof transmits through the compensation film. This is the same with left-eye image light. That is, in this manner, when the size of the phase differences of the left-eye area and the right-eye area of the 3D glasses is the same, the left-eye image light and the right-eye image light are not clearly separated, making it difficult to implement a clear stereoscopic image.

A stereoscopic display device according to an exemplary embodiment of the present invention will now be described.

The stereoscopic display device according to an exemplary embodiment of the present invention includes a display panel 100, an optical filter 200, and 3D glasses 300. Among them, the display panel 100 and the 3D glasses 300 are the same as those described above, so a detailed description thereof will be omitted.

As discussed above, the optical filter 200 serves to adjust the polarization states of left-eye image light and right-eye image light, and any optical filter of a stereoscopic display device generally used in the art can be used without any limitations. In particular, although there is a phase difference deviation between the first and second areas of the optical filter, because the 3D glasses compensate for the deviation, a clear stereoscopic image can be implemented compared with the related art.

According to an exemplary embodiment of the present invention, the optical filter 200 may include: a substrate, an alignment layer formed on the substrate and patterned such that a portion corresponding to the first area and a portion corresponding to the second area have mutually different alignment directions; and a liquid crystal layer formed on the alignment layer.

As the substrate, for example, plastic substrates generally known in the art may be used. The substrate that can be used in the exemplary embodiment of the present invention may include, for example, a cycloolefin polymer substrate such as triacetyl cellulose, polyacrylate, polyethyleneterephthalate, polycarbonate, polyethylene, a norbornene derivative, and the like, but the present invention is not limited thereto. Preferably, the substrate 10 is an isotropic substrate without a phase difference or has only a phase difference value in a thicknesswise direction without a phase difference in a surface direction. The thickness of the substrate 210 may not be particularly limited and, preferably, it generally ranges from 30 µm to 100 µm.

The alignment layer may be patterned to form the first and second areas, but the alignment layer is not particularly limited by type thereof. Namely, a rubbed alignment layer or an optical alignment layer may be used. In this case, the optical alignment layer may be preferred in consideration of the convenience of fabrication process.

The patterned alignment layer may be fabricated by coating an alignment layer on the substrate, irradiating primary UV polarized light onto the entire alignment layer to form a primary alignment, and then irradiating secondary UV polarized light through a mask blocking a light transmission at the first area to form a secondary alignment. Meanwhile, the alignment direction of the alignment layer of the portion corresponding to the first area and that of the portion corresponding to the second area may be perpendicular to each other.

Next, the liquid crystal layer may be formed by coating a liquid crystal material on the patterned alignment layer and hardening (or curing) it. It is fixed in mutually different directions to form first and second areas. The liquid crystal layer may be a $\lambda/4$ phase difference layer.

As mentioned above, in case of the optical filter formed through the light irradiation performed twice, a phase difference deviation may be generated between the first and second areas. However, in case of the stereoscopic display device according to an exemplary embodiment of the present invention, because the phase difference deviation is compensated for by the 3D glasses, a clear stereoscopic image can be implemented in spite of the presence of the phase difference deviation in the optical filter.

Figure 2:
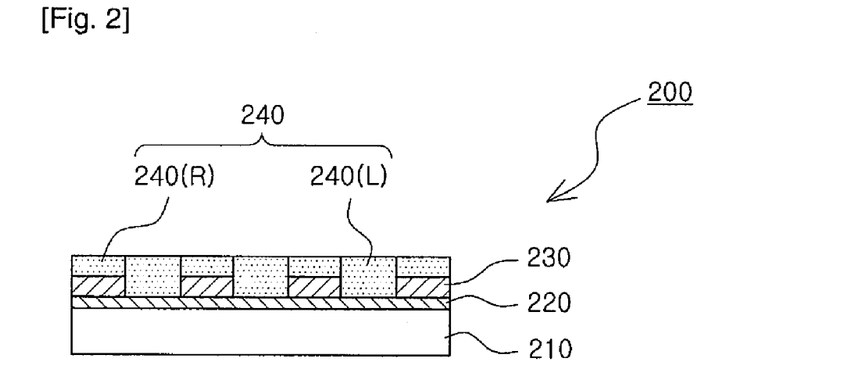
FIG. 2 illustrates an optical filter included in the stereoscopic display device according to an exemplary embodiment of the present invention.

In a different exemplary embodiment, the optical filter may have a structure as shown in FIG. 2, namely, including a substrate 210, a first alignment layer 220, a second alignment layer 230, and a liquid crystal layer 240.

As the substrate, for example, plastic substrates generally known in the art may be used. The substrate that can be used in the exemplary embodiment of the present invention may include, for example, a cycloolefin polymer substrate such as triacetyl cellulose, polyacrylate, polyethyleneterephthalate, polycarbonate, polyethylene, a norbornene derivative, and the like, but the present invention is not limited thereto.

Preferably, the substrate 10 is an isotropic substrate without a phase difference or has only a phase difference value in a thicknesswise direction without a phase difference in a surface direction. The thickness of the substrate 210 may not be particularly limited and, preferably, it generally ranges from 30 µm to 100 µm.

The first alignment layer 220 may be formed on the entire area of one surface of the substrate 210, and the second alignment layer 230 may be formed with a certain pattern on an upper surface of the first alignment layer 220. In this case, the first and second alignment layers 220 and 230 are alternately formed on one surface of the substrate 210. When the liquid crystal layer 240 is formed on the resultant structure, a liquid crystal layer 240R placed on the first alignment layer is aligned by the first alignment layer 220, and a liquid crystal layer 240L placed on the second alignment layer is aligned by the second alignment layer 230.

In this case, the first and second alignment layers are subjected to mutually different alignment processing methods and have mutually different alignment processing directions. For example, when the first alignment layer 220 is an optical alignment layer, a rubbed alignment layer may be used as the second alignment layer, and when the first alignment layer 220 is a rubbed alignment layer, an optical alignment layer may be used as the second alignment layer 230. Because the alignment layers subjected to different processing methods are used, one alignment layer processing method does not affect the other alignment layer, so the alignment layers having the mutually different alignment processing directions can be easily formed without having to perform a complicated process such as using a mask or photoresist. For example, although UV polarized light is irradiated to the rubbed alignment layer, an alignment processing direction of the alignment layer is not changed, and reversely, the same goes for the case in which the optical alignment layer is rubbed. Thus, the first and second alignment layers having mutually different alignment directions may be formed by coating an alignment layer, rubbing it in a first alignment direction to form a rubbed alignment layer, coating a polymer layer for an optical alignment layer at certain intervals on the rubbed alignment layer, and irradiating UV polarized light thereon in a second alignment direction different from the first alignment direction.

In this case, the alignment processing direction of the first and second alignment layers 220 and 230 may be perpendicular to each other.

Next, the liquid crystal layer 240 is formed on the first and second alignment layers 220 and 230 and includes the first area 240R aligned by the second alignment layer and the second area 240L aligned by the first alignment layer. When a liquid crystal material is coated on the alignment layer, the liquid crystal material is aligned along the alignment processing direction of the alignment layer. In this case, because the first and second alignment layers 220 and 230 are formed to be alternately exposed and the alignment directions of the first and second alignment layers 220 and 230 are different, when the liquid crystal layer 240 is formed, the liquid crystal layers 240R and 240L are alternately formed to be aligned in mutually difference directions.

In this case, the pattern of the liquid crystal layer 240 is determined according to a coated pattern of the second alignment layer 230. Namely, when the second alignment layer is coated in a stripe shape, the liquid crystal layer 240 is formed to have the stripe pattern, and when the second alignment layer is coated in a checkerboard pattern, the liquid crystal layer 240 formed in a checkerboard pattern.

The liquid crystal layer 240 may have various phase differences according to its thickness. Preferably, the liquid crystal layer 240 may be a λ/4 phase difference layer. When the liquid crystal layer 240 is a λ/4 phase difference layer, it serves to change an incident light source as linear polarized light into circular polarized light and an incident light source as circular polarized light into linear polarized light. This function of the λ/4 phase difference layer may be advantageously used to display a stereoscopic image.

The liquid crystal layer 240 may be formed on the entire area of the optical filter such that the area through which right-eye image light is transmitted and the area through which left-eye image light is transmitted may be patterned to have mutually perpendicular alignment directions. For example, a λ/4 phase difference layer aligned at 45° may be formed at the portion through which right-eye image light is transmitted and a λ/4 phase difference layer aligned at −45° may be formed on the portion through which left-eye image light is transmitted. In this case, the linear polarized light which has transmitted through the second polarizer is converted into circularly polarized light while passing through the λ/4 phase difference layer, and the right-eye image light and the left-eye image light are circularly polarized light having mutually reversely rotational directions. Namely, when the right-eye image light is right circularly polarized light, the left-eye image light is a left circularly polarized light.

Figure 3:
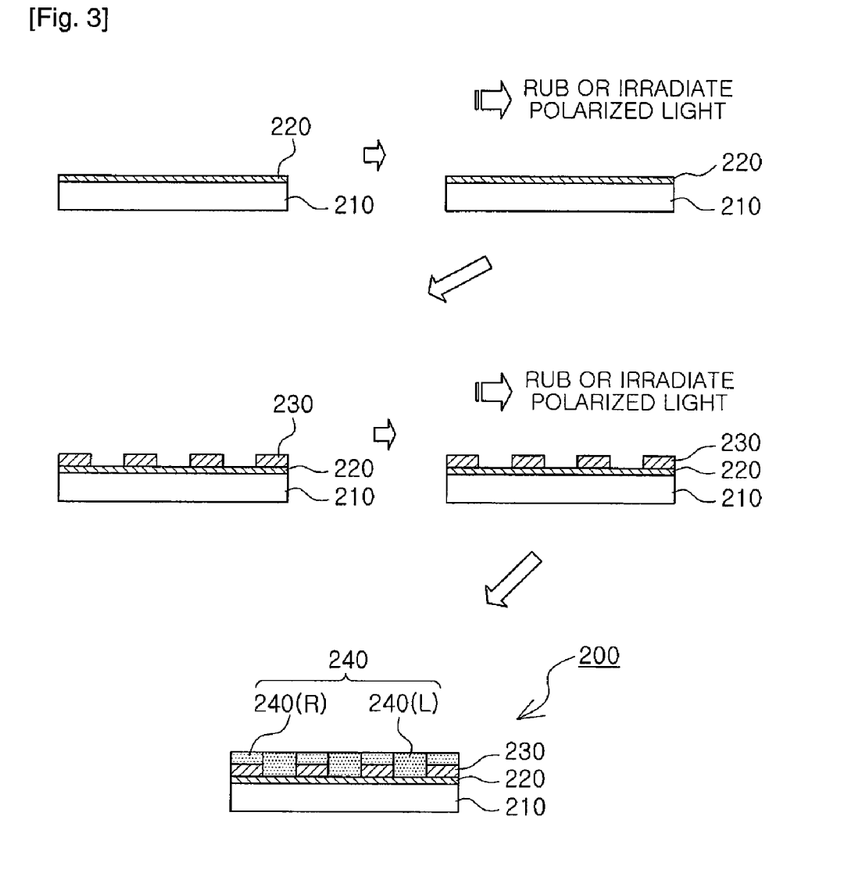
FIG. 3 illustrates a method for manufacturing the optical filter of FIG. 2.

FIG. 3 illustrates a method for fabricating the optical filter having the foregoing structure according to an exemplary embodiment of the present invention. As shown in FIG. 3, the optical filter may be fabricated through (1) a first alignment layer material coating step, (2) a first alignment layer formation step, (3) a second alignment layer material coating step, (4) a second alignment layer formation step, and (5) a liquid crystal material layer formation step.

First, a first alignment layer material is coated on the entire area of one surface of the substrate. In this case, the first alignment layer material may be a polymer film for a rubbed alignment layer or a polymer film for an optical alignment layer.

When the first alignment layer material is coated on the entire surface of the substrate, it is aligned to form a first alignment layer. In this case, a suitable alignment layer processing method may be performed according to the first alignment layer material used. Namely, when the first alignment layer material is a polymer film for a rubbed alignment layer, the first alignment film is formed by rubbing the polymer film with a rubbing cloth in a certain direction (e.g., a first alignment direction) (rubbing alignment method), and when the first alignment layer material is a polymer film for an optical alignment layer, the first alignment layer is formed by irradiating polarized UV to the polymer in a certain direction (first alignment direction) (optical alignment method).

After the first alignment layer is formed in the forgoing manner, a second alignment layer material is coated on the first alignment layer. In this case, the second alignment layer material is coated to form a certain pattern, rather than coated on the entire area. For example, the second alignment layer material may be coated in a stripe pattern or in a checkerboard pattern. When the second alignment layer is selectively coated to have a certain pattern, the first and second alignment layers are alternately exposed.

Meanwhile, the first alignment layer and/or the second alignment layer may be coated according to a printing method. The coating of the alignment layer material according to the printing method is advantageous in that the required material can be coated on only a desired position without performing a complicated process such as using a mask or photoresist. Also, because the material is not wasted at an unnecessary portion, the fabrication cost can be reduced and a line width of a pattern desired to be formed by changing a printing pattern, or the like, can be simply adjusted.

Meanwhile, the material for forming the second alignment layer is different from the material for forming the first alignment layer. Namely, when the first alignment layer is an optical alignment layer, a polymer film for a rubbed alignment layer is used as the second alignment layer, and when the first alignment layer is a rubbed alignment layer, a polymer film for an optical alignment layer may be used as the second alignment layer.

The second alignment layer is formed through a suitable method according to the material of the second alignment layer.

Namely, when the second alignment layer material is a polymer film for a rubbed alignment layer, the second alignment film is formed by rubbing the polymer film with rubbing cloth in a certain direction (e.g., a second alignment direction) (rubbing alignment method), and when the second alignment layer material is a polymer film for an optical alignment layer, the second alignment layer is formed by irradiating polarized UV to the polymer in a certain direction (second alignment direction) (optical alignment method).

The second alignment layer is formed in a different alignment direction from that of the first alignment layer. Preferably, the second alignment layer is formed to be perpendicular to the alignment direction of the first alignment layer. Thus, because the alignment methods of the first and second alignment layers are different, although the first alignment layer is exposed, it is not affected when the second alignment layer is processed. Accordingly, after the second alignment layer is formed, the first alignment layer aligned in the first alignment direction and the second alignment layer aligned in the second alignment direction appear alternately on the surface of the substrate.

Thereafter, a reactive liquid crystal material is coated on the alternately formed first and second alignment layers, on which heat is applied or light is irradiated to form a liquid crystal layer in a crosslinking manner. The reactive liquid crystal refers to a material forming liquid crystal polymer as adjacent liquid crystal monomers are polymerized by light or heat. One or more selected from those having acrylate groups, reactors causing the reactive liquid crystal monomers to be polymerized, may be used as the reactive liquid crystal. Representative examples may be RM (Reactive Mesogen) of Merck & Co., Inc, LC242 of BASF, and the like.

As described above, the optical filter according to an exemplary embodiment of the present invention can be fabricated according to a simple method without performing a multi-step process or a masking process such as photolithography and has excellent optical performance because the alignment layer is formed on the entire area under the liquid crystal without a non-alignment area where alignment is not generated. In addition, because the optical filter is fabricated through a printing process, it can achieve an excellent matching degree with the pixels of the display panel. Meanwhile, in the case of the optical filter, because the second alignment layer having a certain thickness is formed on the first alignment layer, the thickness of the liquid crystal layer formed on the first alignment layer and that of the liquid crystal layer formed on the second alignment layer are different to cause a deviation between the phase difference values of the first and second areas. Actually, the generated deviation in the phase difference value may lead to a failure of implementation of a clear stereoscopic image. However, because the stereoscopic display device according to an exemplary embodiment of the present invention uses the 3D glasses that compensates for the deviation, the crosstalk problem caused by the phase difference deviation can be solved and a clear stereoscopic image can be implemented.

The invention claimed is:

1. 3D glasses for use in a stereoscopic display device that comprises a display panel configured to emit an image light for a right eye and an image light for a left eye and an optical filter comprising a first area configured to adjust a polarized state of the image light for the right eye and a second area configured to adjust a polarized state of the image light for the left eye,
wherein the 3D glasses comprise a right-eye area through which the image light for the right eye passes; and a left-eye area through which the image light for the left eye passes; the right-eye area and the left-eye area each comprising a compensation film configured to compensate for a phase difference deviation between the first and second areas of the optical filter, respectively; wherein a phase difference value of the compensation film in the right-eye area and that of the compensation film in the left-eye area are different from each other, and, wherein when a wavelength of the image light emitted from the display panel is $\lambda$, a sum of the phase difference value of the compensation film in the right-eye area and the phase difference value of the first area and a sum of the phase difference value of the compensation film in the left-eye area and the phase difference value of the second area are $\lambda/2$, respectively.

2. The 3D glasses of claim 1, wherein, when a phase difference value of the first area of the optical filter is $\alpha$, a phase difference value of the second area is $\beta$, and the wavelength of image light emitted from the display panel is $\lambda$, the $\alpha$, $\beta$ and $\lambda$ satisfy "$\alpha+\beta=\lambda/2$" and "$\alpha \neq \beta$", the compensation film included in the right-eye area has a phase difference value $\beta$ and an optical axis perpendicular to that of the second area, and the compensation film included in the left-eye area has a phase difference $\alpha$ and an optical axis perpendicular to that of the first area.

3. A stereoscopic display device comprising:
a display panel configured to emit an image light for a right eye and an image light for a left eye;
an optical filter comprising a first area configured to adjust a polarized state of the image light for the right eye and a second area configured to adjust a polarized state of the image light for the left eye; and
3D glasses comprising a right-eye area through which the image light for the right eye passes; and a left-eye area through which the image light for the left eye passes,
wherein the right-eye area and the left-eye area each comprise a compensation film configured to compensate for a phase difference deviation between the first and second areas of the optical filter, respectively, and a phase difference value of the compensation film in the right-eye area and that of the compensation film in the left-eye area are different from each other, and wherein, when a wavelength of the image light emitted from the display panel is $\lambda$, a sum of the phase difference value of the compensation film in the right-eye area and the phase difference value of the first area and a sum of the phase difference value of the compensation film in the left-eye area and the phase difference value of the second area are $\lambda/2$, respectively.

4. The device of claim 3, wherein, when a phase difference value of the first area of the optical filter is α, a phase difference value of the second area is β, and the wavelength of the image light emitted from the display panel is λ, the α, β and λ satisfy "α+β=λ/2" and "α≠β", the compensation film included in the right-eye area has a phase difference value β and an optical axis perpendicular to that of the second area, and the compensation film included in the left-eye area has a phase difference α and an optical axis perpendicular to that of the first area.

5. The device of claim 3, wherein the optical filter comprises:
   a substrate;
   a first alignment layer formed on the entire surface of the substrate;
   a second alignment layer formed with a certain pattern on the first alignment layer; and
   a liquid crystal layer formed on the first and second alignment layers and comprising a first area aligned by the first alignment layer and a second area aligned by the second alignment layer.

6. The device of claim 5, wherein the first and second alignment layers are made of materials whose alignment processing methods are different.

7. The device of claim 5, wherein the liquid crystal layer is a λ/4 phase difference layer.

8. The device of claim 5, wherein the first alignment layer is a rubbed alignment layer, and the second alignment layer is a photo-aligned alignment layer.

9. The device of claim 5, wherein the first alignment layer is a photo-aligned alignment layer, and the second alignment layer is a rubbed alignment layer.

10. The device of claim 5, wherein alignment directions of the first and second alignment layers are perpendicular to each other.

11. The device of claim 3, wherein the optical filter comprises:
   a substrate;
   an alignment layer formed on the substrate and patterned such that a portion corresponding to the first area and a portion corresponding to the second area have mutually different alignment directions; and
   a liquid crystal layer formed on the alignment layer.

12. The device of claim 11, wherein the alignment layer is a photo-aligned alignment layer.

13. The device of claim 11, wherein the liquid crystal layer is a λ/4 phase difference layer.

14. The device of claim 11, wherein the portion corresponding to the first area and the portion corresponding to the second area have alignment directions perpendicular to each other.

* * * * *